US012694093B2

(12) United States Patent
Ocher et al.

(10) Patent No.: US 12,694,093 B2
(45) Date of Patent: Jul. 28, 2026

(54) FLEXIBLE AND REUSABLE RULE EVALUATION FOR SECURE EXECUTION OF EXTERNAL COMMANDS

(71) Applicant: SAP SE, Walldorf (DE)

(72) Inventors: Alexander Ocher, San Jose, CA (US); Sreenivasulu Gelle, San Ramon, CA (US); Manali Pise, Sunnyvale, CA (US)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 18/594,549

(22) Filed: Mar. 4, 2024

(65) Prior Publication Data

US 2025/0278473 A1      Sep. 4, 2025

(51) Int. Cl.
*G06F 21/00* (2013.01)
*G06F 21/52* (2013.01)

(52) U.S. Cl.
CPC ........ *G06F 21/52* (2013.01); *G06F 2221/033* (2013.01)

(58) Field of Classification Search
CPC ............................ G06F 21/52; G06F 2221/033
See application file for complete search history.

(56) References Cited

U.S. PATENT DOCUMENTS

2018/0102916 A1* 4/2018 Chen ........................ H04L 67/63
2021/0326435 A1* 10/2021 Klonowski ........... G06F 21/554
2023/0401319 A1* 12/2023 Tanami ................. G06F 21/568

OTHER PUBLICATIONS

Learn.Microsoft.com [online], "Use Azure Firewall policy to define a rule hierarchy" Nov. 17, 2022, retrieved on Mar. 4, 2024, retrieved from URL <https://learn.microsoft.com/en-us/azure/firewall-manager/rule-hierarchy>, 6 pages.
Wiki.sei.cmu.edu [online], "ENV33-C. Do not call system" Apr. 27, 2007, retrieved on Mar. 4, 2024, retrieved from URL <https://wiki.sei.cmu.edu/confluence/plugins/servlet/mobile?contentId=87152177#content/view/87152177>, 10 pages.
Wikipedia.org [online], "Exec (system call)" created on Apr. 2006, retrieved on Mar. 4, 2024, retrieved from URL <https://en.wikipedia.org/wiki/Exec (system_call)>, 4 pages.

(Continued)

*Primary Examiner* — Ghazal B Shehni
(74) *Attorney, Agent, or Firm* — Fish & Richardson P.C.

(57) ABSTRACT

The present disclosure involves systems, software, and computer implemented methods for flexible and reusable rule evaluation for secure execution of external commands. One example method includes identifying a first request to execute a command on a computing system. A data structure is accessed that defines rules for commands. A tree of the data structure for the command is evaluated to determine whether to allow execution of the command on the computing system. Respective rule nodes of the tree are evaluated to determine whether corresponding rules for the command are satisfied. Execution of the command on the computing system is allowed in response to determining that the corresponding rule of each evaluated rule node is satisfied and execution of the first command on the first computing system is denied in response to determining that the corresponding rule of each evaluated rule node has not been satisfied.

20 Claims, 4 Drawing Sheets

(56)     References Cited

OTHER PUBLICATIONS

Wikipedia.org [online], "Polytree" created on Apr. 2005, retrieved on Mar. 4, 2024, retrieved from URL <https://en.wikipedia.org/wiki/Polytree>, 3 pages.
Wikipedia.org [online], "Tree (graph theory)" created on Apr. 2002, retrieved on Mar. 4, 2024, retrieved from URL <https://en.wikipedia.org/wiki/Tree_(graph_theory)#Forest>, 8 pages.

* cited by examiner

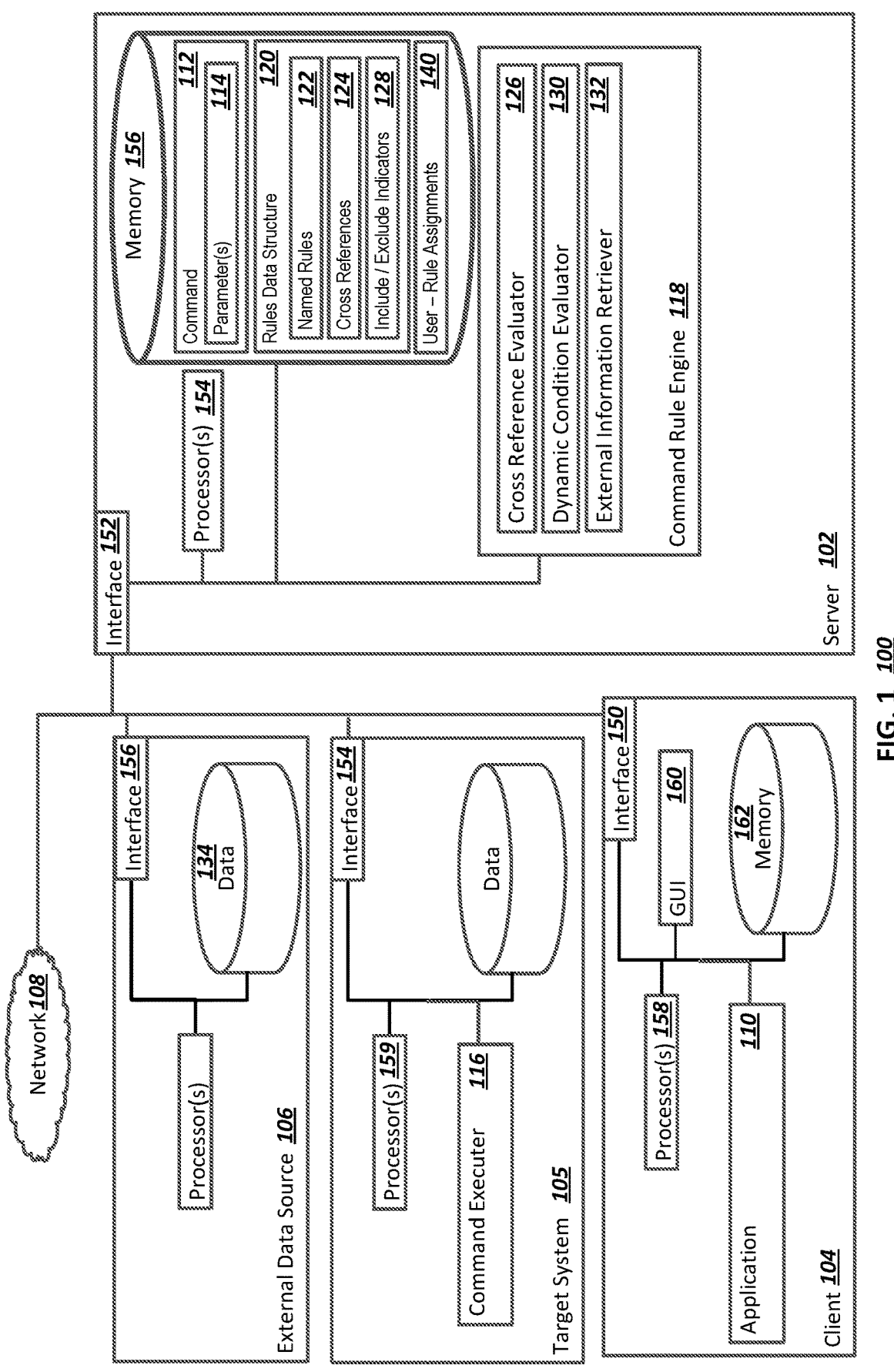
FIG. 1 _100_

| ParentID | ParentDesc | CurrID | CurrDesc | Type | IEFlag | OpCode | ValueFrom | ValueTo | RootFlag | LeafFlag |
|----------|------------|--------|----------|------|--------|---------|-----------|---------|----------|----------|
| null | null | 1 | Custom Orders | CMD | I | EQ | process_orders | | 1 | |
| 1 | Custom Orders | 2 | IP address check | PARAM1 | I | NAMED_RULE | IP_CHECK_FI_SD | | | 1 |
| 1 | Custom Orders | 3 | File mask | PARAM2 | I | LIKE | if.bp??.* | | | 1 |
| 1 | Custom Orders | 4 | Output directory | PARAM3 | I | NAMED_RULE | FI_Files | | | 1 |
| 1 | Custom Orders | 5 | Time check | EXE | E | EQ | to_char(sysdate(),'HH24MM') >= '0900' AND to_char(sysdate(),'HH24MM') <= '1700' | | | 1 |
| 1 | Custom Orders | 6 | User check | EXE | I | NAMED_RULE | FI_SD_USER | | | 1 |

202  204  206  208  210  212  214  216  218  220  222

Main Rules for the example command process_orders <ip_address> <file mask> <output_directory>     201a

Example to call the script:

process_orders 10.48.220.26 'if.bp01.*' /usr/FI/files/inbound     201b

IP_CHECK_FI_SD named rule

| ParentID | ParentDesc | CurrID | CurrDesc | Type | IEFlag | OpCode | ValueFrom | ValueTo | RootFlag | LeafFlag |
|---|---|---|---|---|---|---|---|---|---|---|
| null | null | 7 | IP address check for FI and SD depts | NAMED_RUL_DEF | I | EQ | IP_CHECK_FI_SD | | 1 | |
| 7 | IP address check for FI and SD depts | 8 | IP addresses for FI | SQL | I | IN | SELECT IP_ADDRESS FROM FI_IP_ADRESSES | | | 1 |
| 7 | IP address check for FI and SD depts | 9 | IP addresses for SD | SQL | I | IN | SELECT IP_ADDRESS FROM SD_IP_ADRESSES | | | 1 |

FI_Files named rule

| ParentID | ParentDesc | CurrID | CurrDesc | Type | IEFlag | OpCode | ValueFrom | ValueTo | RootFlag | LeafFlag |
|---|---|---|---|---|---|---|---|---|---|---|
| null | null | 10 | Directory for FI files | NAMED_RUL_DEF | I | EQ | FI_Files | | 1 | |
| 10 | Custom Orders | 11 | FI directory root | LIKE | I | EQ | /usr/FI/files* | | | 1 |
| 10 | Custom Orders | 12 | FI special directory | LIKE | E | EQ | /usr/FI/files/docs/* | | | 1 |

FI_SD_USER named rule

| ParentID | ParentDesc | CurrID | CurrDesc | Type | IEFlag | OpCode | ValueFrom | ValueTo | RootFlag | LeafFlag |
|---|---|---|---|---|---|---|---|---|---|---|
| null | null | 13 | FI and SD users | NAMED_RUL_DEF | I | EQ | FI_SD_USER | | 1 | |
| 13 | List of Operations users for FI | 14 | FI users | SQL | I | IN | SELECT USER FROM FI_USERS | $USER | | 1 |
| 13 | List of Operations users for SD | 15 | SD users | SQL | I | IN | SELECT USER FROM SD_USERS | $USER | | 1 |

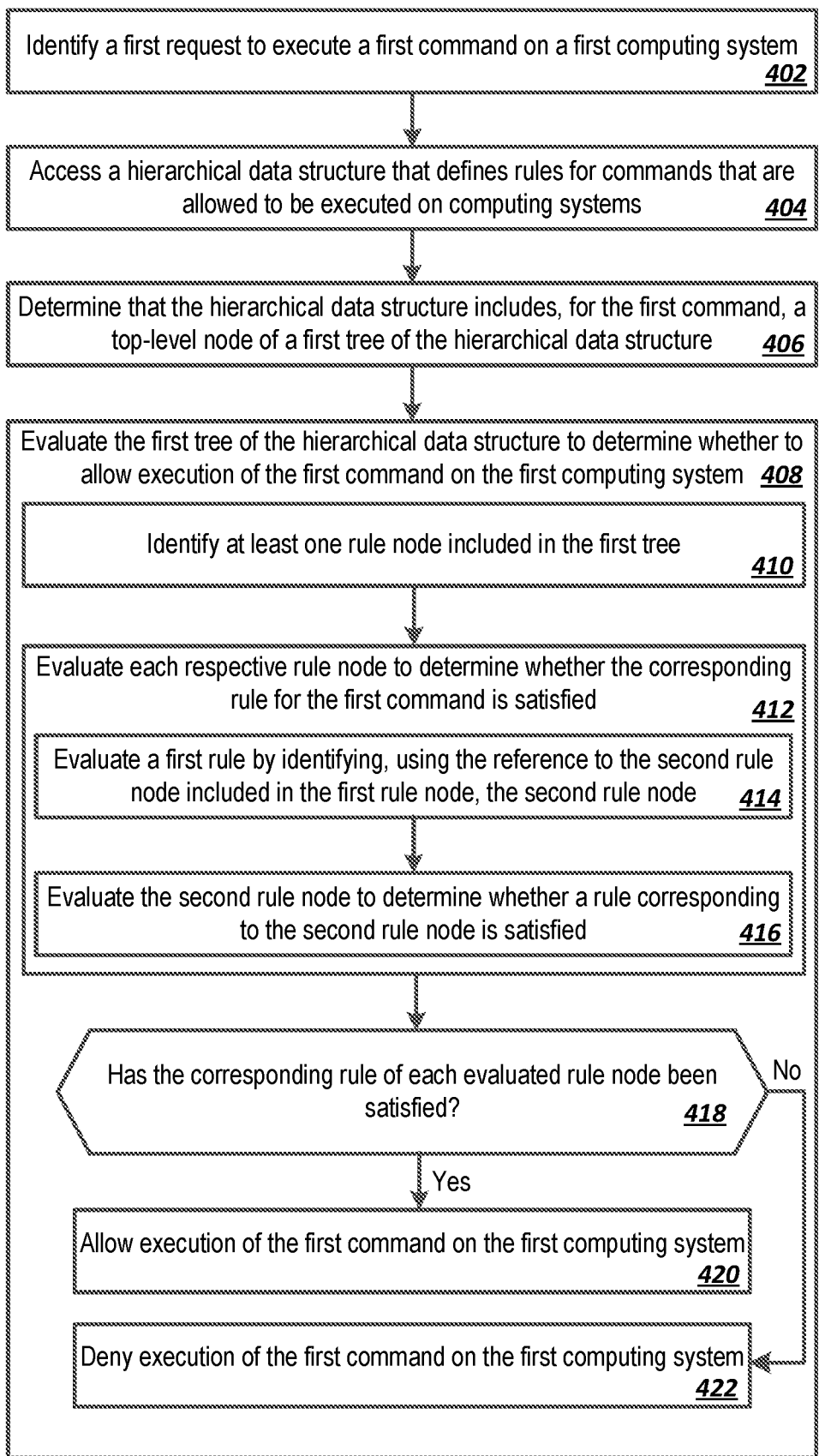

Identify a first request to execute a first command on a first computing system
402

Access a hierarchical data structure that defines rules for commands that are allowed to be executed on computing systems     404

Determine that the hierarchical data structure includes, for the first command, a top-level node of a first tree of the hierarchical data structure     406

Evaluate the first tree of the hierarchical data structure to determine whether to allow execution of the first command on the first computing system     408

Identify at least one rule node included in the first tree
410

Evaluate each respective rule node to determine whether the corresponding rule for the first command is satisfied     412

Evaluate a first rule by identifying, using the reference to the second rule node included in the first rule node, the second rule node     414

Evaluate the second rule node to determine whether a rule corresponding to the second rule node is satisfied     416

Has the corresponding rule of each evaluated rule node been satisfied?     418     No Yes Allow execution of the first command on the first computing system
420

Deny execution of the first command on the first computing system
422

FIG. 4   400

FLEXIBLE AND REUSABLE RULE EVALUATION FOR SECURE EXECUTION OF EXTERNAL COMMANDS

TECHNICAL FIELD

The present disclosure relates to computer-implemented methods, software, and systems for flexible and reusable rule evaluation for secure execution of external commands.

BACKGROUND

Some computer systems may support the ability to request execution of an external command that is external to a requesting computing system. The requesting system can provide a system call, for example, that accepts a name of an external command to execute and also any parameters that the requesting system may want to provide for execution of the external command.

SUMMARY

The present disclosure involves systems, software, and computer implemented methods for flexible and reusable rule evaluation for secure execution of external commands. An example method includes: identifying a first request to execute a first command on a first computing system; accessing a hierarchical data structure that defines rules for commands that are allowed to be executed on computing systems; determining that the hierarchical data structure includes, for the first command, a top-level node of a first tree of the hierarchical data structure; and evaluating the first tree of the hierarchical data structure to determine whether to allow execution of the first command on the first computing system, wherein evaluating the first tree of the hierarchical data structure comprises: identifying at least one rule node included in the first tree, wherein each rule node represents a corresponding rule for the first command and wherein the at least one rule node includes a first rule node that includes a reference to a second rule node in the hierarchical data structure; evaluating each respective rule node to determine whether the corresponding rule for the first command is satisfied, wherein evaluating the first rule node comprises: identifying, using the reference to the second rule node included in the first rule node, the second rule node; and evaluating the second rule node to determine whether a rule corresponding to the second rule node is satisfied; determining to allow execution of the first command on the first computing system in response to determining that the corresponding rule of each evaluated rule node is satisfied; and determining to not allow execution of the first command on the first computing system in response to determining that the corresponding rule of each evaluated rule node has not been satisfied.

Implementations can include one or more of the following features. The first computing system can be an external system external to a computing system at which the first request is received. A second request to execute a second command on the first computing system can be identified. A determination can be made that the hierarchical data structure does not include a node for the second command. A determination can be made to deny execution of the second command on the first computing system in response to determining that the hierarchical data structure does not include a node for the second command. The first request can include at least one command parameter for the first command. A third rule node can define a rule for a first command parameter included in the first request. Evaluation of a third rule node can include evaluation of a dynamic condition. Evaluation of a third rule node can include retrieval of data from an external data source external to the hierarchical data structure and evaluation of the data retrieved from the external data source external to the hierarchical data structure. The hierarchical data structure can be a forest data structure. The second rule node can be a same node of the hierarchical data structure as the first rule node. The second rule node can be included in a second tree of the hierarchical data structure that is separate from the first tree. A third tree in the hierarchical data structure that is separate from the first tree in the hierarchical data structure can include a third rule node that refers to the second rule node. The third tree in the hierarchical data structure can include a fourth rule node and a fifth rule node. The fifth rule node can include an exclusion condition that adjusts the corresponding rule of the fourth rule node by excluding, from the fourth rule node, data specified in the fifth rule node. The hierarchical data structure can include: a third tree starting at a third rule node that corresponds to a third rule; and a fourth tree starting at a fourth rule node that corresponds to a fourth rule. The third rule can be defined by specifying at least one adjustment to the fourth tree. The third rule can be defined by at least one of: referring to, in the third tree, a subset of rule nodes included in the fourth tree; and including, in the third tree, at least one rule node that is not included in the fourth tree. The third rule and the fourth rule can both be for the first command. The third rule can be for the first command and the fourth rule can be for a second command which is a different command than the first command.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 is a block diagram illustrating an example system for flexible and reusable rule evaluation for secure execution of external commands.

FIGS. 2 and 3A-3C illustrate example tables for defining security rules for an example command.

FIG. 4 is a flowchart of an example method for flexible and reusable rule evaluation for secure execution of external commands.

DETAILED DESCRIPTION

Many software products allow a user to execute an external command (e.g., using a system( ) or exec( ) function). An external command can be, for instance, a script or executable that is executed on an external system external to a system currently being used by the user (or application executing on behalf of a user). External command execution can be inherently dangerous because external command execution can result in execution, on the external system, of an arbitrary program with arbitrary parameters that may harm the external system if the input is maliciously tainted, for example. For instance, a bad actor may attempt to copy confidential files onto an external drive, delete all files in a directory, or some other harmful action.

Existing solutions may rely on whitelists or blacklists of allowed or disallowed commands, access control lists, or other methods. However, existing solutions don't protect against using legitimate commands in an unauthorized manner (e.g., invoking delete or copy commands to cause harm). In contrast, the solution described herein provides a rule-based security framework to allow executing only legitimate commands and only with legitimate parameters, in a flexible and extendable manner.

For instance, the solution provides for secure execution of permitted external commands with permitted parameters using a hierarchical security mechanism. Once the hierarchical security mechanism is implemented, the system can guarantee that only safe commands will be allowed by the system. Users cannot circumvent the security mechanism and therefore the system can prevent users from execution commands they are not allowed to execute.

The solution uses flexible rules that can be organized hierarchically in a tree/forest structure, where each node in the structure can represent a security rule. Using the flexible structure, various types of flexible security limitations can be expressed while providing assurance that if rules are configured correctly users of a system will not be able to execute any harmful commands. In contrast to existing approaches, the solution allows for substantial granularity in defining security rules in that any kind of restriction can be expressed due to the hierarchical structure of the security framework. Additionally, dynamic conditions can enable evaluation of various factors, including the interdependence of parameters (e.g., a rule may specify that first and second parameters cannot refer to a same file name), user permissions, context/environmental parameters (e.g., date/time), and other available information.

The hierarchical structure of the security mechanism allows for the organization of rules at different levels. For instance, higher-level rules can provide initial checks that can be inherited by lower levels. For instance, multiple levels of conditions may pertain to a same command or object. For example, different levels of rules can apply for different parts of a command (e.g., for example, different parameters of a same command or a rule that combines conditions for both the command and a parameter). Additionally, cross-reference approaches are supported, in that any node in the hierarchical structure can refer to other elements on any level (lower, equal or higher node) in a same or different subtree. Further examples and details are described below.

FIG. 1 is a block diagram illustrating an example system 100 for flexible and reusable rule evaluation for secure execution of external commands. Specifically, the illustrated system 100 includes or is communicably coupled with a server 102, a client device 104, a target system 105, an external data source 106, and a network 108. Although shown separately, in some implementations, functionality of two or more systems or servers may be provided by a single system or server. In some implementations, the functionality of one illustrated system, server, or component may be provided by multiple systems, servers, or components, respectively.

The client device 104 includes an application 110 that can submit (e.g., in response to a user request or input) different requests to the server 102. For instance, the application 110 can submit a request to the server 102 that represents a request to execute a command 112. The request may be to execute the command 112 (which may include one or more parameters 114) on the target system 105. The target system 105 may receive the command 112 and use a command executor 116 to execute the received command, for example. The target system 105 and the command 112, in the context of FIG. 1, are an external system and an external command, with respect to the server 102, respectively. Although requests for execution of external commands are described, in some cases the request is for execution of a command on the server 102 itself. And although client/server examples are described, other examples include a user being directly logged into the server 102, the server 102 being a non-server device, etc.

In response to receiving the request to execute the command 112, a command rule engine 118 may determine whether execution of the command 112 is allowed. For instance, the command rule engine 118 can validate the command 112 against a hierarchical rules data structure 120. If the command rule engine 118 validates the command 112 against the hierarchical rules data structure 120, the server 102 can provide the command 112 to the target system 105. If the command rule engine 118 cannot validate the command against the hierarchical rules data structure 120, the server 102 can reject the request to execute the command 112.

The hierarchical rules data structure 120 can be implemented as a forest data structure. Some nodes in the hierarchical rules data structure 120 can have their own independent hierarchy and other nodes can rely on other parts of the hierarchical rules data structure 120. A given node can represent a respective security rule. A tree/forest structure for security rule nodes can provide a hierarchical arrangement of nodes connected by edges in that any two nodes can be connected. Each tree can have an arbitrary depth and can include nodes that may be of a same or different type (even on a same level). In some implementations, structural information and data for a forest data structure implementation of the hierarchical rules data structure 120 is stored in a relational database and may be indexed.

The hierarchical rules data structure 120 can include named rules 122. For example, any node (with all nodes below it) can be transformed into a named rule. Introduction of a named rule can enable referencing the named rule elsewhere in the hierarchy. For instance, a named rule of "CopyMove" can be created and can be used for rules for parameters for both "Copy" and "Move" commands.

For example, in the hierarchical rules data structure 120, each node in the forest can refer to other nodes on any level. That is, the hierarchical rules data structure 120 can support cross references 124 that are evaluated by a cross reference evaluator 126 when the command 112 is evaluated by the command rule engine 118. Cross references can enable various scenarios. For example, a rule designer may develop various rules for various conditions for a copy command, ensuring that only specific files can be copied to specific directories, etc. The rule designer can design the rules for the copy command as reusable rules that can be reused (e.g., referred by) a move command rule. In general, a cross reference 124 can be 1) a reference to a lower-level node in a different subtree (e.g., a general rule for allowed directories can specifically refer to the exclusion of a single directory); 2) a reference to a same-level node in a same subtree (e.g., for ensuring that the first and second parameters for a "move file" command cannot refer to a same file name); or 3) a reference to an upper-level node in a different subtree (e.g., a second parameter of a "copy" command can reference a previously-defined higher-level rule).

As a particular example, nodes in the hierarchical rules data structure 120 can specify include/exclude indicators 128. For example, rule(s) can be defined such that directories under a "/usr/FI/files" directory are allowed except for a "/usr/FI/files/secret_documents" directory. As another example, the hierarchical rules data structure 120 may include a complex rule for a first command which almost represents requirements for a second command. A new rule can be made for the second command that builds upon the existing rule for the first command but excludes certain nodes or adds additional nodes to represent the different requirement(s) for the second command.

Nodes in the hierarchical rules data structure 120 can also include dynamic conditions that are evaluated by a dynamic condition evaluator 130. Dynamic conditions can refer to context information, such as current date and time. For instance, rules can be configured to allow or disallow certain commands during or after regular business hours. As another example, rule evaluation can include evaluation of external information (e.g., information external to the hierarchical rules data structure 120) that has been retrieved by an external information retriever 132 from the external data source 106.

As an example, the external data source 106 can include a data source 134 (e.g., a database) that includes valid server addresses that may be used as parameters for certain commands. A rule in the hierarchical rules data structure 120 can include specification of a query that queries the data source 134 to retrieve the valid server addresses. The command rule engine 118 can use the external information retriever 132 to invoke the query, to retrieve the valid server addresses from the data source 134, when evaluating the rule.

The command rule engine 118 can also validate changes to the hierarchical rules data structure 120 before any rule changes are committed. For instance, some changes involving deleting, updating or inserting new nodes may cause one or more trees in the forest to be restructured or rebalanced. Accordingly, the command rule engine 118 can perform integrity checks before finalizing any changes. For example, the command rule engine 118 may inform a user that is attempting to delete a first node that is referred to by another node that the node reference must be removed before the first node can be deleted.

In some implementations, rules can be assigned to certain system users. For example, the server 102 (or another system or database) can maintain user/rule assignments 140. The command rule engine 118 can allow the command 112 if the user who submitted the request is assigned to the command, for example. User-specific conditions can also be specified in command rules. User-specific rules and other example rules and details are described below.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, 154, and 156 are used by the client device 104, the server 102, the target system 105, and the external data source 106, respectively, for communicating with other systems in a distributed environment—including within the system 100—connected to the network 108. Generally, the interfaces 150, 152, 154, and 156 each comprise logic encoded in software and/or hardware in a suitable combination and operable to communicate with the network 108. More specifically, the interfaces 150, 152, 154, and 156 may each comprise software supporting one or more communication protocols associated with communications such that the network 108 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 108 using a wireline or wireless connection. In general, the client device 104 comprises an electronic computer device operable to receive, transmit, process, and store any appropriate data associated with the system 100 of FIG. 1. The client device 104 can include one or more client applications, including the application 110. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102. Similarly, the target system 105 includes one or more processors 159. Each processor 159 included in the target system 159 may be a central processing unit (CPU), an application specific integrated circuit (ASIC), a field-programmable gate array (FPGA), or another suitable component. Generally, each processor 159 executes instructions and manipulates data to perform the operations of the target system 105. Specifically, each processor 159 included executes the functionality required to receive and process requests from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the application 110. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 108, or any other number suitable to the purposes of the system 100. Additionally, there may also be one or more additional client devices 104 external to the illustrated portion of system 100 that are capable of interacting with the system 100 via the network 108. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

FIG. 2 illustrates an example table 200 for defining security rules for an example command. The example command is a custom script with a name of "process_orders". The custom script invokes an FTP (File Transfer Protocol) command to retrieve files that include customer orders from business partners of an organization and copies the retrieved files to a shared directory to enable an ERP (Enterprise Resource Processing) system to retrieve the files for further processing. The organization has configured the table 200 (and other tables or table portions as described in FIGS. 3A-3C) to implement various security rules. For instance, table configurations illustrated in FIGS. 2 and 3A-3C have defined rules to enforce that the custom script is: 1) not available to anyone outside certain teams (e.g., financial intelligence or sales and distribution teams); 2) not available to be ran during normal business hours of 9:00 AM to 5:00 PM; and 3) not allowed to write to any directory outside of a financial intelligence (FI) file system area.

A command syntax description area 201 describes syntax of the example command. For example, a syntax pattern 201*a* indicates that the example command has an intended pattern of "process_orders <ip_address> <file mask> <output_directory>". That is, a pattern of the example command is the command name (e.g., "process_orders") followed by: 1) a first parameter indicating an IP (Internet Protocol) address of a server from which to obtain files; 2) a second parameter indicating a file mask that described a file name pattern used to retrieve files that match the file name pattern; and 3) a third parameter that indicates an output directory in which to store retrieved files. For instance, for an example command invocation 201*b*, a first parameter is an IP address of "10.48.230.26", a second parameter indicates a file mask of 'if.bp01.*', and a third parameter indicates an output directory of "/usr/FI/files/inbound". In this example, the output directory specifies a directory on the source system at which to copy files retrieved from the target system.

The table 200 includes a ParentID (Parent Identifier) column 202, a ParentDesc (Parent Description) column 204, a CurrID (Current Identifier) column 206, a CurrDesc (Current Description) column 208, a Type column 210, an IEFlag (Include/Exclude Flag) column 212, an OpCode (Operation Code) column 214, a ValueFrom column 216, a ValueTo column 218, a RootFlag column 220, and a LeafFlag column 222.

The ParentID column 202 can store, for a given row, a unique identifier of the parent row of the row. If the ParentID column 202 includes a NULL value for the row, the row includes a command definition. The ParentDesc column can store, for a given row, a description of the parent row of the row. Each child row of a parent row can include a same parent description. The CurrID column 206 can store, for a given row, a unique identifier for the row. The CurrDesc column 208 can store, for a given row, a description of the row. The Type column 210 can store, for a given row, a type of the row. Example types can include "CMD" (e.g., command), "PARAMn" (e.g., the nth parameter of a command), "NAMED_RULE" (e.g., a reference to a named rule that is represented as a separate top-level object in the table 200), "EXE" (e.g., logical condition), or "SQL" (e.g., SQL (Structured Query Language) command). The IEFlag column 212 indicates, for a given row, whether a rule defined by the row is met when a condition associated with the row is true (e.g., IEFlag value of "I") or false (e.g., IEFlag value of "E").

The condition associated with the row can be defined using values in the OpCode column 214, the ValueFrom column 216, and possibly the ValueTo column 218. The OpCode column 214 can store, for a given row, a logical operation code indicating a logical operation to use for the condition associated with the row. Logical operation codes can include "EQ" (is equal to), "GT" (is greater than), "LE" (is less than or equal to), "LIKE" (matches a pattern), etc. The ValueFrom column 216 can store, for a given row, a value that is evaluated, with respect to the logical operation, to determine if the condition associated with the row is true or false. The ValueTo column 218 can store, for a given row and for some logical operations, a second value that is evaluated, with respect to the logical operation, to determine if the condition associated with the row is true or false. For example, a "BETWEEN" logical operation may use two values.

The RootFlag column 220 can store, for a given row, a Boolean value (e.g., true or false, one or zero, etc.) that indicates whether the row defines a root node of a tree in the forest. For instance, the first row in the table (e.g., row with CurrID value of one) has a RootFlag value of one (e.g., true). The LeafFlag column 222 can store, for a given row, a Boolean value that indicates whether the row corresponds to a leaf node of a tree. For example, in the table 200, all rows other than the first row have a LeafFlag value of one (e.g., true).

Referring now to specific rows of the table 200 (which are referred to below by respective CurrID values), a first row (e.g., CurrID=1) has a NULL ParentID value, indicating that the first row corresponds to a command definition. A CurrDesc value of "Custom Orders" describes the command. A type value of CMD also indicates that the first row defines a command and an EQ OpCode value indicates that a ValueFrom value of "process_orders" indicates the name of the command being defined.

Second, third, fourth, fifth, and sixth rows (e.g., CurrID values of 2, 3, . . . 6, respectively) each have a ParentID value of 1, indicating that those rows provide further details for the command introduced in the first row. For example, PARAM1, PARAM2, AND PARAM3 type values for the second, third, and fourth rows indicate that those rows define rules for the first, second, and third command parameters of the example command, respectively.

An "IP address check" description value for the second row indicates that the second row corresponds to a rule regarding an IP address check (e.g., for the first command parameter). A "NAMED_RULE" OpCode value and an "IP_CHECK_FI_SD" ValueFrom value for the second row indicate that the IP address check rule is a named rule defined in another part of the forest (e.g., in another part of the table 200 or in a separate table). For instance, FIG. 3A, described below, illustrates definition of the IP_CHECK_FI_SD named rule. The first command parameter can be passed as an input to the IP_CHECK_FI_SD named rule.

A "File mask" description value for the third row of the table 200 indicates that the third row corresponds to a rule regarding a file mask check (e.g., for the second command parameter). A "LIKE" OpCode value and an "if.bp??.*" ValueFrom value for the third row indicates that the rule represented by the third row is satisfied if the second command parameter matches a file mask pattern specified in the ValueFrom value.

An "Output directory" description value for the fourth row indicates that the fourth row corresponds to a rule regarding a output directory check (e.g., for the third command parameter). A "NAMED_RULE" OpCode value and a "FI_Files" ValueFrom value for the fourth row indicate that the output directory check rule is a named rule defined in another part of the forest (e.g., in another part of the table 200 or in a separate table). For instance, FIG. 3B, described below, illustrates definition of the FI_Files named rule. The third command parameter can be passed as an input to the FI_Files named rule.

The fifth and sixth rows of the table 200 each have a type of "EXE" indicating that those rows define other rules that are checked and satisfied if respective logical conditions are met. For instance, a "Time check" description value for the fifth row indicates that the fifth row corresponds to a dynamic time check for ensuring that the command is not attempted during prohibited hours. An "E" IEFlag value and an "EQ" value in the fifth row indicate that the rule is satisfied if an evaluation of a condition specified in the ValueFrom column is not true. The ValueFrom value in the fifth row defines a condition in which a current system time is during working hours (e.g., between 9:00 AM and 5:00 PM). The system can evaluate the condition specified in the ValueFrom column and evaluate the time check rule as true if the condition specified in the ValueFrom column is not true. That is, the time check rule passes if the current time is not between 9:00 AM and 5:00 PM.

A "User check" description value for the sixth row indicates that the sixth row corresponds to a rule regarding a user check for a user that is attempting to execute the command. A "NAMED_RULE" OpCode value and a "FI_SD_USER" ValueFrom value for the sixth row indicate that the user check rule is a named rule defined in another part of the forest (e.g., in another part of the table 200 or in a separate table). For instance, FIG. 4C, described below, illustrates definition of the FI_SD_USER named rule.

FIG. 3A illustrates an example table 300 for defining security rules for an example command. Although shown as a separate table from the table 200, the table 300 may be part (e.g., a continuation of) the table 300. For example, the table 300 includes rows with CurrID values of 7, 8, and 9, and accordingly the description below refers to rows seven, eight, and nine, respectively (e.g., of an overall table defining different rules for the example command). The seventh row (e.g., CurrID=7) has a ParentID value of NULL indicating that the seventh row starts definition of a separate tree in the forest that is separate from a tree started by the first row of the table 200. A CurrDesc value for the seventh row indicates that the seventh row is for defining an IP address check for "FI" and "SD" (Sales and Distribution) departments. A type value of "NAMED_RUL_DEF" for the seventh row indicates that the rule corresponding to the seventh row is a definition of a named rule. An OpCode value of "EQ" and a ValueFrom value of "IP_CHECK_FI_SD" indicate that the seventh row defines a named rule with a name of IP_CHECK_FI_SD. As noted above, the second row of the table 200 refers to the named rule of IP_CHECK_FI_SD, so evaluation of that second row can result in a routing to the seventh row shown in the table 300, for evaluation of the named rule defined in the table 300 with respect to the first command parameter.

The eighth and ninth rows (e.g., CurrID values of 8 and 9, respectively) each have a ParentID value of 7, indicating that those rows provide further details for the named rule introduced in the seventh row. An "IP addresses for FI" description value for the eighth row indicates that the eighth row corresponds to a check to determine if an IP address (e.g., an IP address provided as a first command parameter) matches any IP addresses that are known as valid IP addresses for an FI department. An "SQL" type value for the eighth row indicates that the FI IP check is implemented as an SQL query. An "IN" OpCode value indicates that the rule represented by the eighth row is satisfied if the input to the named rule (e.g., the first command parameter, as described above) is included in a set of values generated by execution of an SQL query of "SELECT IP_ADDRESS FROM FI_IP_ADDRESSES" specified for the ValueFrom field of the eighth row. The SQL query can query an external table (e.g., external to the tables 200 and 300), such as another table in a same database as the tables 200 and 300 or a table in another database either internal or external to the system that includes the tables 200 and 300).

Similar to the eighth row, an "IP addresses for SD" description value for the ninth row indicates that the ninth row corresponds to a check to determine if an IP address (e.g., an IP address provided as a first command parameter) matches any IP addresses that are known as valid IP addresses for an SD department. An "SQL" type value for the ninth row indicates that the SD IP check is implemented as an SQL query. An "IN" OpCode value indicates that the rule represented by the ninth row is satisfied if the input to the named rule (e.g., the first command parameter) is included in a set of values generated by execution of an SQL query of "SELECT IP_ADDRESS FROM SD_IP_ADDRESSES" specified for the ValueFrom field of the ninth row.

With respect to the eighth and ninth rows, implicit OR logic can be an assumed configuration, in that the command can be allowed if either the rule corresponding to the eighth row or the rule corresponding to the ninth row is satisfied. In general, other logical predicates can be implemented, for example, by using condition fields as well as different logical structures (for example, a row with multiple parents).

FIG. 3B illustrates an example table 330 for defining security rules for an example command. Similar to the table 300, although shown as a separate table from the table 200, the table 330 may be part (e.g., a continuation of) the table 200. For example, the table 330 includes rows with CurrID values of 10, 11, and 12, and accordingly the description below refers to rows ten, eleven, and twelve, respectively (e.g., of an overall table defining different rules for the example command). The tenth row (e.g., CurrID=10) has a ParentID value of NULL indicating that the tenth row starts definition of a separate tree in the forest that is separate from a tree started by the first row of the table 200. A CurrDesc value for the tenth row indicates that the tenth row is for defining a rule for a "Directory for FI files". A type value of "NAMED_RUL_DEF" for the tenth row indicates that the rule corresponding to the tenth row is a definition of a named rule. An OpCode value of "EQ" and a ValueFrom value of "FI_Files" indicate that the tenth row defines a named rule with a name of FI_Files. As noted above, the fourth row of the table 200 refers to the named rule of FI_Files, so evaluation of that fourth row can result in a routing to the tenth row shown in the table 330, for evaluation of the named rule defined in the table 330 with respect to the third command parameter.

A "File directory root" description value for the eleventh row (e.g., CurrID=11) indicates that the eleventh row corresponds to a rule regarding a directory name pattern for the third command parameter. A "LIKE" OpCode value and a "/usr/FI/files*" ValueFrom value for the eleventh row indicates that the rule represented by the eleventh row is satisfied if the third command parameter matches the directory name pattern specified in the ValueFrom value of the twelfth row.

An "FI special directory" description value for the twelfth row (e.g., CurrID=12) indicates that the twelfth row corresponds to a rule regarding a directory name pattern for the third command parameter. A "LIKE" OpCode value, an "E" (Exclude) IEFlag value, and a "/ur/FI/files/docs/*" ValueFrom value for the twelfth row indicates that the rule represented by the twelfth row is satisfied if the third command parameter does NOT match the directory name pattern specified in the ValueFrom value of the twelfth row. The FI special directory may be excluded as a valid directory for copying files into, for example.

FIG. 3C illustrates an example table 360 for defining security rules for an example command. Although shown as a separate table from the table 200, the table 360 may be part (e.g., a continuation of) the table 200. For example, the table 360 includes rows with CurrID values of 13, 14, and 15, and accordingly the description below refers to rows thirteen, fourteen, and fifteen, respectively (e.g., of an overall table defining different rules for the example command). The thirteenth row (e.g., CurrID=13) has a ParentID value of NULL indicating that the thirteenth row starts definition of a separate tree in the forest that is separate from a tree started by the first row of the table 200. A CurrDesc value for the thirteenth row indicates that the thirteenth row is for defining a check to see if the user attempting to execute the command is a recognized FI or SD user (e.g., a user included in one of those teams or departments). A type value of "NAMED_RUL_DEF" for the thirteenth row indicates that the rule corresponding to the thirteenth row is a definition of a named rule. An OpCode value of "EQ" and a ValueFrom value of "FI_SD_USER" indicate that the thirteenth row defines a named rule with a name of FI_SD_USER. As noted above, the sixth row of the table 200 refers to the named rule of FI_SD_USER, so evaluation of that sixth row can result in a routing to the thirteenth row shown in the table 360, for evaluation of the named rule defined in the table 360.

The fourteenth and fifteenth rows (e.g., CurrID values of 14 and 15, respectively) each have a ParentID value of 13, indicating that those rows provide further details for the named rule introduced in the thirteenth row. A "List of Operations users for FI" description value for the fourteenth row indicates that the fourteenth row corresponds to a check to determine if the user attempting to execute the command is a member of the FI department. An "SQL" type value for the fourteenth row indicates that the FI user check is implemented as an SQL query. An "IN" OpCode value indicates that the rule represented by the fourteenth row is satisfied if a $USER ValueTo value is included in a set of values generated by execution of an SQL query of "SELECT USER FROM FI_USERS" specified for the ValueFrom field of the fourteenth row. The $USER value can be an environment variable that is replaced before execution of the SQL query with the user name of the user attempting to execute the command. The SQL query can query an external table (e.g., external to the tables 200 and 360), such as another table in a same database as the tables 200 and 360 or a table in another database either internal or external to the system that includes the tables 200 and 360).

Similar to the fourteenth row, a "List of Operations users for FI" description value for the fifteenth row indicates that the fifteenth row corresponds to a check to determine if the user attempting to execute the command is a member of the SD department. An "SQL" type value for the fifteenth row indicates that the SD user check is implemented as an SQL query. An "IN" OpCode value indicates that the rule represented by the fifteenth row is satisfied if a $USER ValueTo value is included in a set of values generated by execution of an SQL query of "SELECT USER FROM SD_USERS" specified for the ValueFrom field of the fifteenth row. Similar to the eighth and ninth rows shown in FIG. 3A, with respect to the fourteenth and fifteenth rows, implicit OR logic can be an assumed configuration, in that the command can be allowed if either the rule corresponding to the fourteenth row or the rule corresponding to the fifteenth row is satisfied.

FIG. 4 is a flowchart of an example method for flexible and reusable rule evaluation for secure execution of external commands. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the server 102 of FIG. 1.

At 402, a first request to execute a first command on a first computing system is identified. The first computing system can be an external system external to a computing system at which the first request is received. The first request can include at least one command parameter for the first command.

At 404, a hierarchical data structure that defines rules for commands that are allowed to be executed on computing systems is accessed. Some rule nodes can define rules for parameters of the command. The hierarchical data structure can be a forest data structure.

At 406, a determination is made that the hierarchical data structure includes, for the first command, a top-level node of a first tree of the hierarchical data structure.

At 408, the first tree of the hierarchical data structure is evaluated to determine whether to allow execution of the first command on the first computing system At 410, evaluating the first tree of the hierarchical data structure includes identifying at least one rule node included in the first tree. Each rule node represents a corresponding rule for the first command and the at least one rule node includes a first rule node that includes a reference to a second rule node in the hierarchical data structure. The second rule node can be included in a second tree of the hierarchical data structure that is separate from the first tree. A third tree in the hierarchical data structure that is separate from the first tree in the hierarchical data structure can include a third rule node that refers to the second rule node.

A third tree in the hierarchical data structure can include a fourth rule node and a fifth rule node, where the fifth rule node includes an exclusion condition that adjusts the corresponding rule of the fourth rule node by excluding, from the fourth rule node, data specified in the fifth rule node. As another example, the hierarchical data structure can include: 1) a third tree starting at a third rule node that corresponds to a third rule; and 2) a fourth tree starting at a fourth rule node that corresponds to a fourth rule. The third rule can be defined by specifying at least one adjustment to the fourth tree. The third rule can be defined by at least one of: 1) referring to, in the third tree, a subset of rule nodes included in the fourth tree; and 2) including, in the third tree, at least one rule node that is not included in the fourth tree. The third rule and the fourth rule can both be for the first command or the third rule can be for the first command and the fourth rule can be for a second command which is a different command than the first command.

At 412, evaluating the first tree includes evaluating each respective rule node to determine whether the corresponding rule for the first command is satisfied. Evaluation of rule nodes can include evaluation of dynamic conditions. For example, evaluation of a rule node can include retrieval of data from an external data source external to the hierarchical data structure and evaluating the data retrieved from the external data source external to the hierarchical data structure.

At 414, the first rule node is evaluated which includes identifying, using the reference to the second rule node included in the first rule node, the second rule node.

At 416, the second rule node is evaluated to determine whether a rule corresponding to the second rule node is satisfied.

At 418, a determination is made for each evaluated rule node as to whether the corresponding rule of the evaluated rule node is satisfied.

At 420, a determination is made to allow execution of the first command on the first computing system in response to determining that the corresponding rule of each evaluated rule node is satisfied.

At 422, a determination is made to deny execution of the first command on the first computing system in response to determining that the corresponding rule of each evaluated rule node has not been satisfied.

A second request to execute a second command on the first computing system can be received. A determination can be made that the hierarchical data structure does not include a node for the second command. A determination can be made to deny execution of the second command on the first computing system in response to determining that the hierarchical data structure does not include a node for the second command.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
identifying a first request to execute a first command on a first computing system;
accessing a hierarchical data structure that defines rules for commands that are allowed to be executed on computing systems;
determining that the hierarchical data structure includes, for the first command, a top-level node of a first tree of the hierarchical data structure; and
evaluating the first tree of the hierarchical data structure to determine whether to allow execution of the first command on the first computing system, wherein evaluating the first tree of the hierarchical data structure comprises:
identifying at least one rule node included in the first tree, wherein each rule node represents a corresponding rule for the first command and wherein the at least one rule node includes a first rule node that includes a reference to a second rule node in the hierarchical data structure;
evaluating each respective rule node to determine whether the corresponding rule for the first command is satisfied, wherein evaluating the first rule node comprises:
identifying, using the reference to the second rule node included in the first rule node, the second rule node; and
evaluating the second rule node to determine whether a rule corresponding to the second rule node is satisfied; and
in response to determining that the corresponding rule of each evaluated node is satisfied, allowing execution of the first command on the first computing system; and
in response to determining that the corresponding rule of each evaluated rule node has not been satisfied:
determining that the first request to execute the first command is not a legitimate command execution request for the first computing system; and
determining to not allow execution of the first command on the first computing system.

2. The computer-implemented method of claim 1, wherein the first computing system is an external system external to a computing system at which the first request is received.

3. The computer-implemented method of claim 1, further comprising:
identifying a second request to execute a second command on the first computing system;
determining that the hierarchical data structure does not include a node for the second command; and
determining to deny execution of the second command on the first computing system in response to determining that the hierarchical data structure does not include a node for the second command.

4. The computer-implemented method of claim 1, wherein the first request includes at least one command parameter for the first command.

5. The computer-implemented method of claim 4, wherein a third rule node defines a rule for a first command parameter included in the first request.

6. The computer-implemented method of claim 1, wherein evaluation of a third rule node includes evaluation of a dynamic condition.

7. The computer-implemented method of claim 1, wherein evaluation of a third rule node includes:
retrieval of data from an external data source external to the hierarchical data structure; and
evaluation of the data retrieved from the external data source external to the hierarchical data structure.

8. The computer-implemented method of claim 1, wherein the hierarchical data structure is a forest data structure.

9. The computer-implemented method of claim 1, wherein the second rule node is a same node of the hierarchical data structure as the first rule node.

10. The computer-implemented method of claim 1, wherein the second rule node is included in a second tree of the hierarchical data structure that is separate from the first tree.

11. The computer-implemented method of claim 10, wherein a third tree in the hierarchical data structure that is separate from the first tree in the hierarchical data structure includes a third rule node that refers to the second rule node.

12. The computer-implemented method of claim 11, wherein the third tree in the hierarchical data structure includes a fourth rule node and a fifth rule node, wherein the fifth rule node includes an exclusion condition that adjusts the corresponding rule of the fourth rule node by excluding, from the fourth rule node, data specified in the fifth rule node.

13. The computer-implemented method of claim 1, wherein:
the hierarchical data structure includes:
a third tree starting at a third rule node that corresponds to a third rule; and
a fourth tree starting at a fourth rule node that corresponds to a fourth rule; and
the third rule is defined by specifying at least one adjustment to the fourth tree.

14. The computer-implemented method of claim 13, wherein the third rule is defined by at least one of:
referring to, in the third tree, a subset of rule nodes included in the fourth tree; and
including, in the third tree, at least one rule node that is not included in the fourth tree.

15. The computer-implemented method of claim 13, wherein the third rule and the fourth rule are for the first command.

16. The computer-implemented method of claim 13, wherein the third rule is for the first command and the fourth rule is for a second command which is a different command than the first command.

17. A system comprising:
one or more computers; and
a computer-readable medium coupled to the one or more computers having instructions stored thereon which, when executed by the one or more computers, cause the one or more computers to perform operations comprising:
identifying a first request to execute a first command on a first computing system;

accessing a hierarchical data structure that defines rules for commands that are allowed to be executed on computing systems;

determining that the hierarchical data structure includes, for the first command, a top-level node of a first tree of the hierarchical data structure; and evaluating the first tree of the hierarchical data structure to determine whether to allow execution of the first command on the first computing system, wherein evaluating the first tree of the hierarchical data structure comprises:

identifying at least one rule node included in the first tree, wherein each rule node represents a corresponding rule for the first command and wherein the at least one rule node includes a first rule node that includes a reference to a second rule node in the hierarchical data structure;

evaluating each respective rule node to determine whether the corresponding rule for the first command is satisfied, wherein evaluating the first rule node comprises:

identifying, using the reference to the second rule node included in the first rule node, the second rule node; and evaluating the second rule node to determine whether a rule corresponding to the second rule node is satisfied; and in response to determining that the corresponding rule of each evaluated node is satisfied, allowing execution of the first command on the first computing system; and in response to determining that the corresponding rule of each evaluated rule node has not been satisfied:

determining that the first request to execute the first command is not a legitimate command execution request for the first computing system; and preventing execution of the first command on the first computing system.

18. The system of claim 17, wherein the first computing system is an external system external to a computing system at which the first request is received.

19. A non-transitory, computer-readable medium coupled to one or more processors and having instructions stored thereon which, when executed by the one or more processors, cause the one or more processors to perform operations, the operations comprising:

identifying a first request to execute a first command on a first computing system;

accessing a hierarchical data structure that defines rules for commands that are allowed to be executed on computing systems;

determining that the hierarchical data structure includes, for the first command, a top-level node of a first tree of the hierarchical data structure; and evaluating the first tree of the hierarchical data structure to determine whether to allow execution of the first command on the first computing system, wherein evaluating the first tree of the hierarchical data structure comprises:

identifying at least one rule node included in the first tree, wherein each rule node represents a corresponding rule for the first command and wherein the at least one rule node includes a first rule node that includes a reference to a second rule node in the hierarchical data structure;

evaluating each respective rule node to determine whether the corresponding rule for the first command is satisfied, wherein evaluating the first rule node comprises:

identifying, using the reference to the second rule node included in the first rule node, the second rule node; and evaluating the second rule node to determine whether a rule corresponding to the second rule node is satisfied; and in response to determining that the corresponding rule of each evaluated node is satisfied, allowing execution of the first command on the first computing system; and in response to determining that the corresponding rule of each evaluated rule node has not been satisfied:

determining that the first request to execute the first command is not a legitimate command execution request for the first computing system; and preventing execution of the first command on the first computing system.

20. The computer-readable medium of claim 19, wherein the first computing system is an external system external to a computing system at which the first request is received.

* * * * *